Patented Dec. 13, 1932

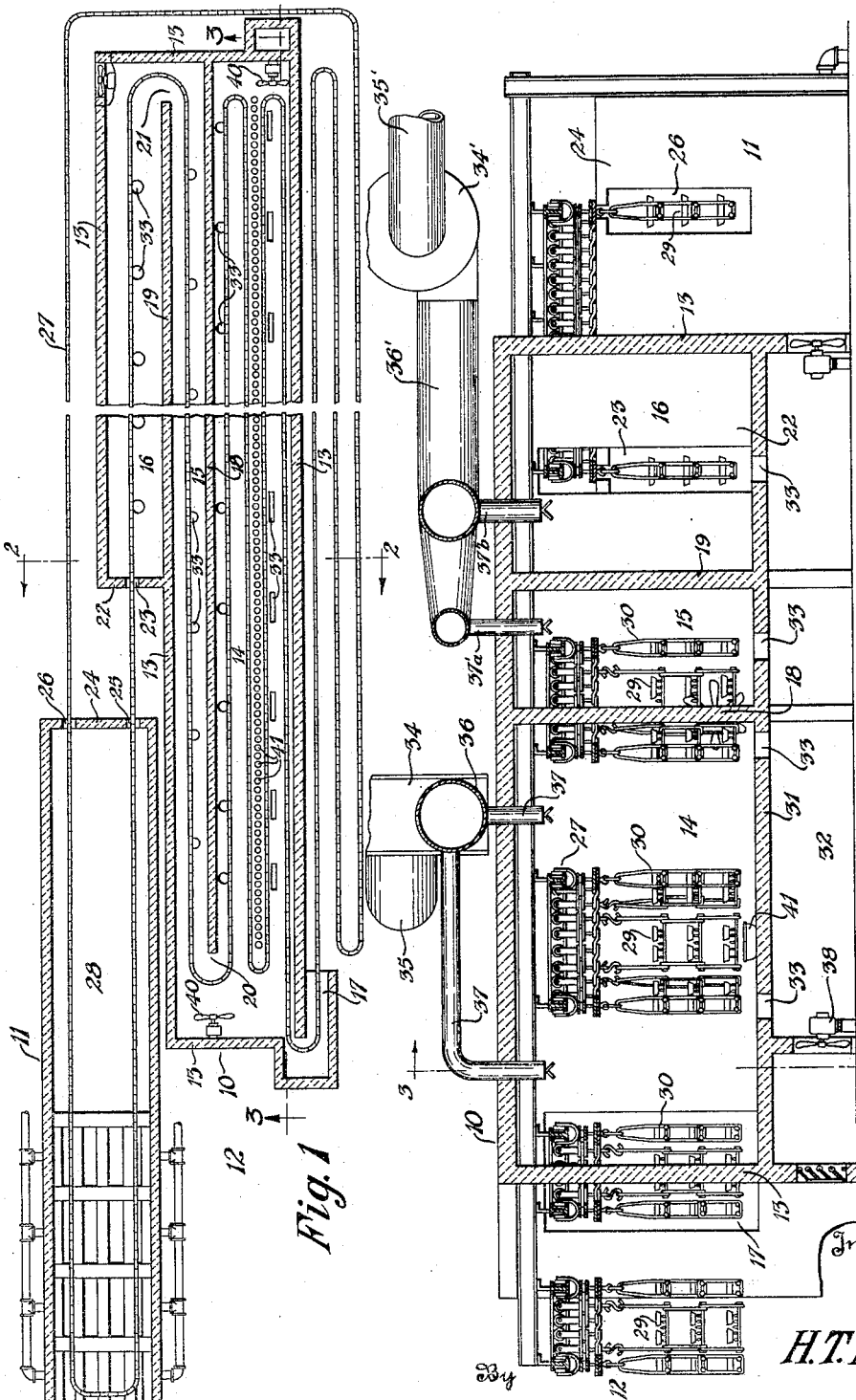

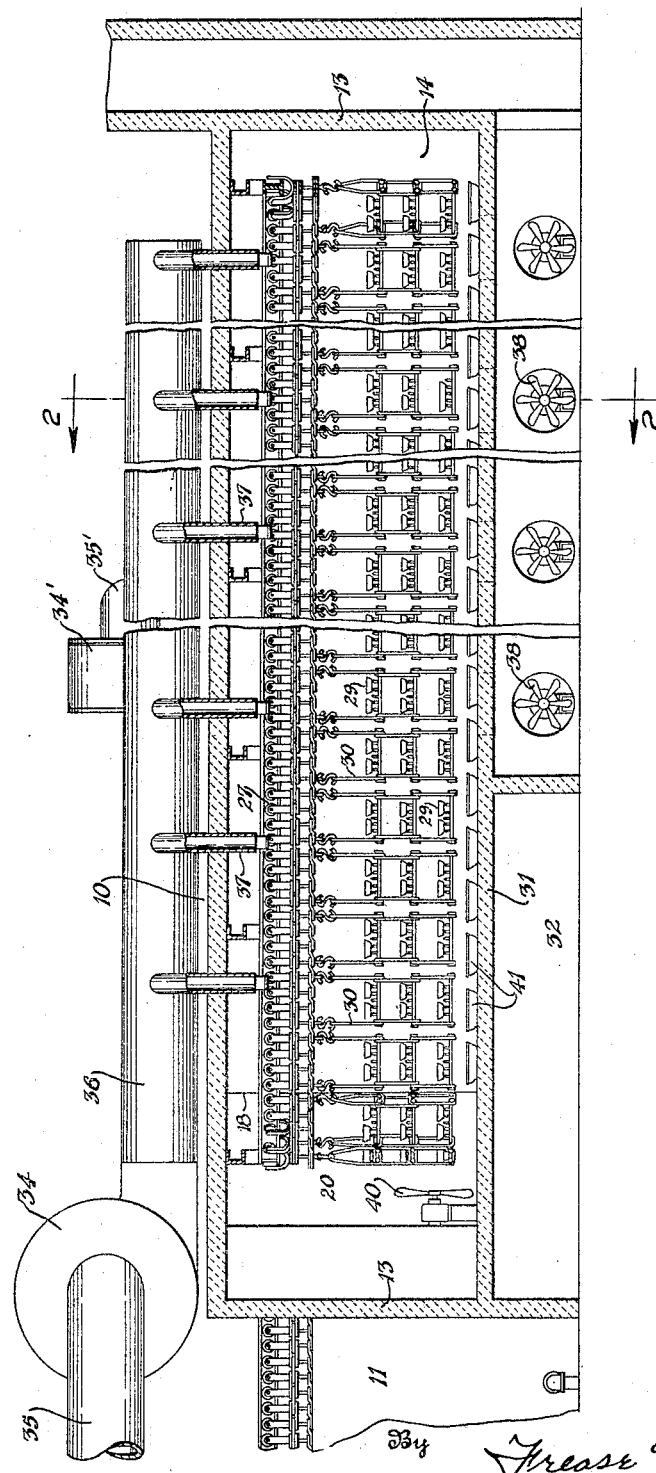

1,890,897

UNITED STATES PATENT OFFICE

HARRY T. BEBB, OF CANTON, OHIO, ASSIGNOR TO THE CANTON STAMPING & ENAMELING COMPANY, OF CANTON, OHIO, A CORPORATION OF OHIO

CONTINUOUS ENAMEL WARE MANUFACTURE

Application filed January 22, 1931. Serial No. 510,447.

My invention relates to continuous enamel ware manufacture, and more particularly to an improved apparatus and process for making preferably single coat mottle gray enamel ware, and the present invention includes subject matter set forth in my prior application for patent for continuous enamel ware manufacture, filed May 13, 1929, Serial No. 362,834.

More particularly, the product manufactured by the use of the present invention has a distinctive mottled gray finish, and this finish is usually applied to a formed sheet steel article such as a pan, cup, or the like.

In the manufacture of such enamel ware, the enameling liquid is first applied to the formed sheet steel article, usually by dipping.

The dipped ware is then dried, and in order to obtain the mottled effect, the drying should be done by moving hot air, the temperature change may not be effected too rapidly, and the humidity of the drying air should be controlled.

Heretofore the usual method of making this ware, has included placing the dipped ware on stationary racks located in a drying room, and then flowing or blasting hot air through the drying room.

After the ware has been properly dried, it is then burned in the furnace, and has heretofore required a transfer from the drying rack frames to the burning rack frames.

This transferring operation has required as many as seven men in actual practice.

The desired and characteristic mottled gray finish results from an oxidizing reaction between the liquid enamel and the metal of the ware, and in addition to the excessive labor cost in producing mottled gray enamel ware by the old method, if the ware is left too long in the drying room or if material changes in atmosphere or temperature takes place, the ware becomes over-oxidized or pitted, its quality is impaired, and no two pieces of the ware have a uniform appearance.

One object of the present improvements is to provide a method and apparatus for continuously drying and burning single coat mottled gray enamel ware, thereby reducing the manufacturing cost thereof.

A second object of the present improvements is to provide a method and apparatus for drying and burning single coat mottled gray enamel ware, whereby a superior and uniform quality of ware may be produced.

A third object of the present improvement is to reduce the factory floor space required for large quantity production.

The foregoing and other objects are attained by the methods, and the apparatus, parts, improvements, and combinations, which comprise the present invention, and which are particularly and distinctly pointed out and set forth in the appended claims forming part hereof.

The improved apparatus hereof is primarily intended to carry out the improved method hereof, which may be stated in general terms as including the steps of continuously passing preferably formed steel articles coated with liquid enamel at a predetermined rate of travel through an ordinary atmosphere, which may be the atmosphere of the usual drying room of an enamel ware manufacturing plant, and then through successive controlled and moving drying atmospheres, the temperature and humidity of each drying atmosphere being maintained within narrow limits, and then through a burning atmosphere having zones of different temperatures.

A preferred embodiment of the improved apparatus for carrying out the improved method or process is illustrated in the accompanying drawings forming part hereof, in which Figure 1 is a diagrammatic plan sectional view of the improved apparatus;

Fig. 2, an enlarged fragmentary diagrammatic transverse sectional view thereof as on lines 2—2, Figs. 1 and 3; and Fig. 3, an enlarged fragmentary longitudinal sectional view thereof as on lines 3—3, Figs. 1 and 2.

Similar numerals refer to similar parts throughout the drawings.

The improved apparatus includes a dryer 10 and a furnace 11 which are preferably located in a zone 12, which may be an enclosed room, such as the ordinary drying room of an enamel ware manufacturing plant.

The dryer 10 is preferably built of refractory walls 13, which form a plurality of successive communicating zones or chambers 14, 15, and 16.

The first zone or chamber 14 of the dryer, communicates with the zone 12 in which the dryer as a whole is located, as by means of an inlet passageway 17 formed in the dryer walls.

For conserving space, the drying chambers 14, 15, and 16 are laterally adjacent and preferably side by side; and the chambers 14 and 15 have a common partition wall 18; and the chambers 15 and 16 have a common partition wall 19.

The inlet passageway 17 as illustrated is preferably formed at one end corner of the dryer 10; and preferably at the same end of the dryer 10, the wall 18 has an opening 20 formed therein for providing communication between the chambers 14 and 15; and at the opposite end of the dryer, the wall 19 has an opening 21 formed therein for providing communication between the chambers 15 and 16.

At the other end of the chamber 16 is located an end closure wall 22, having formed therein an outlet opening 23 for the dryer. This outlet opening 23 communicates with the zone 12, as illustrated, and one end wall 24 of the furnace 11 is located directly opposite the end wall 23 of the chamber 16, and the furnace wall 24 has formed therein an inlet opening 25 opposite the outlet opening 23 of the dryer, and the furnace wall 24 has also formed therein an outlet opening 26 laterally spaced from the opening 25.

If desired, the dryer may communicate directly with the furnace.

A continuous endless chain conveyer 27, or the like, passes through the inlet passageway 17 into the dryer and through the successive chambers thereof, thence through the dryer outlet opening 23, and through the furnace inlet opening 25 into the interior 28 of the furnace and thence out of the furnace outlet opening 26 into the zone 12, and thence back to the dryer.

As illustrated, the first drying chamber 14 has a greater volume than the successive drying chambers for accommodating therein substantially 4 times the length of chain conveyer as is accommodated in the chamber 15, and the chamber 16 has a volume less than the volume of the chamber 15 for accommodating less length of the chain conveyer.

Accordingly with a constant speed of travel of the chain conveyer 27, which speed may be substantially 20 ft. per minute, ware indicated generally by 29, and carried by the conveyer, as by means of racks 30 depending from the conveyer 27, is subject for different lengths of time to the successive atmospheres of the successive zones or chambers.

Means are provided for maintaining the successive zones or chambers of the apparatus at different temperatures, for maintaining differently directed blasts of air in each drying chamber and for maintaining different humidities in each drying chamber.

The temperature of the zone 12 as aforesaid is the temperature of the ordinary drying room of an enamel ware manufacturing plant, which may be substantially 90° F.

The temperature of the drying chamber or zone 14 is preferably maintained for the purposes of the present invention, at 80°–85° F. The temperature of the drying chamber or zone 15 is maintained substantially at 140° F. and the temperature of the drying chamber or zone 16 is maintained at substantially 147° F.

The interior of the furnace 28 is maintained at its end adjacent the inlet opening 25 at substantially 700° F. and at the other burner end of the furnace, the temperature is substantially 1640° F.

While the heating means and the air moving means for the drying chambers may be separate, in the present embodiment of the improved apparatus hereof, common heating and air blasting means are provided by blowing or blasting hot air through the several chambers.

All the chambers of the dryer 10 have a common bottom wall 31 which is likewise the top wall of an exhaust chamber 32. The wall 31 has a plurality of openings 33 formed therein for each of the chambers 14, 15, and 16 for providing a communication between each drying chamber and the exhaust chamber 32.

Vertically directed blasts of hot air are supplied to the drying chamber 14 as by means of a blower 34 whose inlet duct 35 is connected with a source of hot air, and whose longitudinally extending outlet duct 36 communicates with the top of the chamber 14 through a plurality of branch outlet ducts 37.

The chambers or zones 15 and 16 are maintained at their differential temperatures and provided with vertical blasts of air as by means of a blower 34' whose inlet duct 35' is connected with a source of air hotter than the source for the blower 34, and whose longitudinally extending outlet duct 36' communicates with the upper portions of the chambers 15 and 16 through branch ducts 37′a and 37′b, respectively, the ducts 37′b having the greater capacity.

One or more booster or exhaust fans 38 are located in the exhaust chamber 32 for facilitating drawing the differentially heated air vertically through the several drying chambers 14, 15, and 16.

A plurality of horizontally directed fans 40 are located in the several drying chambers as illustrated for maintaining differently directed blasts of air therein.

The humidity of the several drying chambers is separately controlled both by the relative volumes of the chambers, and by the use of a supply of water, which may be maintained as illustrated in pans 41 located in the chamber 14.

I claim:

1. Apparatus for the continuous manufacture of enamel ware and the like, including walls forming a plurality of communicating drying chambers laterally adjacent to each other, means for conveying ware having liquid enamel applied thereon continuously through the successive drying chambers, and separate means for maintaining a temperature in each drying chamber different from the temperature in the others.

2. Apparatus for the continuous manufacture of enamel ware and the like, including walls forming a plurality of communicating drying chambers laterally adjacent to each other, means for conveying ware having liquid enamel applied thereon continuously through the successive drying chambers, means for passing a blast of air through each of the drying chambers, and separate means for maintaining the temperature in each chamber different from the temperature of the others.

3. Apparatus for the continuous manufacture of enamel ware and the like, including walls forming a plurality of communicating drying chambers laterally adjacent to each other, means for conveying ware having liquid enamel applied thereon continuously through the successive drying chambers, separate means for forcibly circulating air of a predetermined temperature through each chamber for maintaining the temperature in the chamber different from the temperature in the other chambers.

4. Apparatus for the continuous manufacture of enamel ware and the like including walls forming a plurality of communicating drying chambers, means for conveying ware having liquid enamel applied thereon continuously through the successive drying chambers, a longitudinally extending duct adjacent one wall of each chamber, means providing a plurality of spaced communications between each duct and the adjacent chamber, and independent means for forcing a blast of air through each duct for maintaining a temperature in each drying chamber different from that in the others.

5. Apparatus for the continuous manufacture of enamel ware and the like, including walls forming a plurality of communicating drying chambers, means for conveying ware having liquid enamel applied thereon continuously through the successive drying chambers, a longitudinally extending duct adjacent one wall and a longitudinally extending duct adjacent another wall of each chamber, a duct connecting the longitudinally extending ducts, means for providing communications between each chamber and the longitudinally extending ducts, and independent means for forcibly circulating air from the ducts through each chamber for maintaining a temperature in each drying chamber different from that in the others.

6. Apparatus for the continuous manufacture of enamel ware including outside walls enclosing a plurality of drying chambers, partition walls within the outside walls forming a series of laterally adjacent drying chambers, the partition walls having openings formed therein communicating between each drying chamber and the next adjacent drying chamber, walls forming a burning chamber adjacent the drying chambers and having an opening formed therein for receiving ware from the last drying chamber, and means for conveying ware having liquid enamel applied thereon continuously through the successive drying chambers and the burning chamber.

7. Apparatus for the continuous manufacture of enamel ware including outside walls enclosing a plurality of drying chambers, partition walls within the outside walls forming a series of laterally adjacent drying chambers, the partition walls having openings formed therein communicating between each drying chamber and the next adjacent drying chamber, walls forming a burning chamber adjacent the drying chambers and having an opening formed therein for receiving ware from the last drying chamber, means for conveying ware having a liquid enamel applied thereon continuously through the successive drying chambers and the burning chamber, and independent means for maintaining a temperature in each drying chamber different from the temperatures in the others.

8. Apparatus for the continuous manufacture of enamel ware including outside walls enclosing a plurality of drying chambers, partition walls within the outside walls forming a series of laterally adjacent drying chambers, the partition walls having openings formed therein communicating between each drying chamber and the next adjacent drying chamber, walls forming a burning chamber adjacent the drying chambers and having an opening formed therein for receiving ware from the last drying chamber, means for conveying ware having liquid enamel applied thereon continuously through the successive drying chambers and the burning chamber, means for passing a blast of air through each of the drying chambers, and independent means for maintaining a temperature in each drying chamber different from the temperatures in the others.

In testimony that I claim the above, I have hereunto subscribed my name.

HARRY T. BEBB.